United States Patent
Fujiki et al.

(10) Patent No.: US 9,208,395 B2
(45) Date of Patent: Dec. 8, 2015

(54) POSITION AND ORIENTATION MEASUREMENT APPARATUS, POSITION AND ORIENTATION MEASUREMENT METHOD, AND STORAGE MEDIUM

(75) Inventors: Masakazu Fujiki, Kawasaki (JP); Yusuke Nakazato, Tokyo (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 13/811,776

(22) PCT Filed: Aug. 12, 2011

(86) PCT No.: PCT/JP2011/068726
§ 371 (c)(1),
(2), (4) Date: Jan. 23, 2013

(87) PCT Pub. No.: WO2012/023593
PCT Pub. Date: Feb. 23, 2012

(65) Prior Publication Data
US 2013/0121592 A1 May 16, 2013

(30) Foreign Application Priority Data
Aug. 20, 2010 (JP) .................. 2010-185576

(51) Int. Cl.
G06K 9/32 (2006.01)
G01B 11/00 (2006.01)
G06T 7/00 (2006.01)

(52) U.S. Cl.
CPC ............ *G06K 9/3241* (2013.01); *G01B 11/002* (2013.01); *G06T 7/0046* (2013.01); *G06T 2207/10004* (2013.01)

(58) Field of Classification Search
None
See application file for complete search history.

(56) References Cited

U.S. PATENT DOCUMENTS

| 6,792,370 B2 | 9/2004 | Satoh et al. |
| 6,993,450 B2 | 1/2006 | Takemoto et al. |

(Continued)

FOREIGN PATENT DOCUMENTS

| JP | 01-009307 A | 1/1989 |
| JP | 10-09307 A | 1/1989 |

(Continued)

OTHER PUBLICATIONS

Drummond et al., "Real-Time Visual Tracking of Complex Structures", IEEE Transactions on Pattern Analysis and Machine Intelligence, vol. 24, No. 7, Jul. 2002, pp. 932-946.

(Continued)

*Primary Examiner* — Chan Park
*Assistant Examiner* — Mia M Thomas
(74) *Attorney, Agent, or Firm* — Fitzpatrick, Cella, Harper & Scinto

(57) ABSTRACT

An apparatus comprises: extraction means for extracting an occluded region in which illumination irradiated onto the target object is occluded in an obtained two-dimensional image; projection means for projecting a line segment that constitutes a three-dimensional model onto the two-dimensional image based on approximate values of position/orientation of the target object; association means for associating a point that constitutes the projected line segment with a point that constitutes an edge in the two-dimensional image; determination means for determining whether the associated point that constitutes an edge in the two-dimensional image is present within the occluded region; and measurement means for measuring the position/orientation of the target object based on a distance on the two-dimensional image between the point that constitutes the projected line segment and the point that constitutes the edge, the points being associated as the pair, and a determination result.

21 Claims, 7 Drawing Sheets

(56) References Cited

U.S. PATENT DOCUMENTS

| | | | |
|---|---|---|---|
| 7,092,109 B2 | 8/2006 | Satoh et al. | |
| 7,130,754 B2 | 10/2006 | Satoh et al. | |
| 7,414,732 B2 * | 8/2008 | Maidhof et al. | 356/601 |
| 7,420,556 B2 | 9/2008 | Fujiki | |
| 7,860,345 B2 | 12/2010 | Satoh et al. | |
| 7,957,564 B2 * | 6/2011 | Abe | 382/115 |
| 7,965,304 B2 | 6/2011 | Sakagawa et al. | |
| 8,223,146 B2 | 7/2012 | Kotake et al. | |
| 8,929,642 B2 * | 1/2015 | Ichimaru | 382/152 |
| 2003/0097068 A1 * | 5/2003 | Hossack et al. | 600/443 |
| 2007/0165931 A1 * | 7/2007 | Higaki | 382/128 |
| 2007/0242899 A1 * | 10/2007 | Satoh et al. | 382/286 |
| 2009/0022365 A1 * | 1/2009 | Kotake | 382/103 |
| 2009/0122231 A1 * | 5/2009 | Aoyagi et al. | 349/65 |
| 2009/0285460 A1 * | 11/2009 | Ishikawa et al. | 382/128 |
| 2010/0054576 A1 * | 3/2010 | Tsujita | 382/134 |
| 2010/0103250 A1 * | 4/2010 | Ishihara | 348/61 |
| 2010/0142826 A1 | 6/2010 | Kotake et al. | |
| 2010/0226558 A1 * | 9/2010 | Muquit et al. | 382/134 |
| 2010/0274391 A1 * | 10/2010 | Dai | 700/259 |
| 2010/0289797 A1 | 11/2010 | Tateno et al. | |
| 2010/0328682 A1 | 12/2010 | Kotake et al. | |
| 2011/0071675 A1 * | 3/2011 | Wells et al. | 700/250 |
| 2011/0211066 A1 | 9/2011 | Fujiki | |
| 2011/0292205 A1 * | 12/2011 | Yuguchi et al. | 348/142 |
| 2012/0033071 A1 | 2/2012 | Kobayashi et al. | |
| 2012/0148100 A1 * | 6/2012 | Kotake et al. | 382/103 |
| 2012/0262455 A1 | 10/2012 | Watanabe et al. | |
| 2012/0275654 A1 | 11/2012 | Fujiki et al. | |
| 2013/0076865 A1 * | 3/2013 | Tateno et al. | 348/46 |
| 2013/0094706 A1 | 4/2013 | Nakazato | |
| 2013/0108116 A1 | 5/2013 | Suzuki et al. | |
| 2013/0114886 A1 | 5/2013 | Kotake et al. | |

FOREIGN PATENT DOCUMENTS

| | | |
|---|---|---|
| JP | 09-97395 A | 4/1997 |
| JP | 90-97395 A | 4/1997 |
| JP | 2001-249008 A | 9/2001 |
| JP | 2009-059260 A | 3/2009 |
| JP | 2010-134649 A | 6/2010 |

OTHER PUBLICATIONS

Lowe, "Object Recognition from Local Scale-Invariant Features", Proc. of the International Conference on Computer Vision, Corfu, Spet. 1999, pp. 1-8.

Zhang, "A Flexible New Technique for Camera Calibration", IEEE Transactions on Pattern Analysis and Machine Intelligence, vol. 22, No. 11, Nov. 2000, pp. 1330-1334.

Wuest et al., "Adaptive Line Tracking with Multiple Hypotheses for Augmented Reality", Proceedings of the International Symposium on mixed and Augmented Reality (ISMAR'05).

* cited by examiner

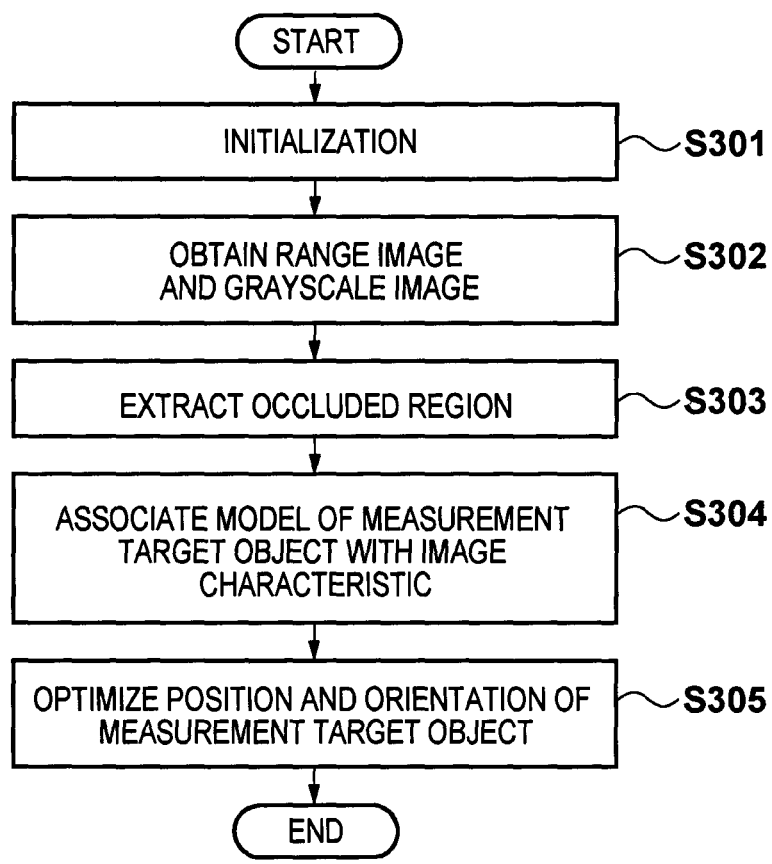
F I G. 3

POSITION AND ORIENTATION MEASUREMENT APPARATUS, POSITION AND ORIENTATION MEASUREMENT METHOD, AND STORAGE MEDIUM

TECHNICAL FIELD

The present invention relates to a position and orientation measurement apparatus, a position and orientation measurement method, and a storage medium, particularly, a position and orientation measurement apparatus, a position and orientation measurement method, and a storage medium for associating a feature of an object model with an image feature, and performing fitting and matching between the model and image data.

BACKGROUND ART

Due to recent development in the robot technology, complicated tasks such as assembling of industrial products, which have been manually performed, are now increasingly performed by robots. Such a robot grasps components by using an end effector such as a hand, and assembles the components. In order for the robot to grasp a component, it is necessary to measure relative position and orientation between a component to be grasped and the robot (hand). In addition to the case in which a robot grasps components, such measurement of the position and orientation is applied to various purposes such as self-position estimation for autonomous movement of robots, positioning between the real space and virtual objects in augmented reality, and the like.

Methods that uses a two-dimensional image captured by a camera is one example of the method for measuring the position and orientation. In such methods, measurement based on model fitting, in which a three-dimensionally shaped model of an object is fitted to a feature detected from a two-dimensional image, is generally performed. For example, in T. Drummond and R. Cipolla, "Real-time visual tracking of complex structures," IEEE Transactions on Pattern Analysis and Machine Intelligence, vol. 24, no. 7, pp. 932-946, 2002, a method is disclosed in which the position and orientation of an object are measured by using an edge as a feature detected from the two-dimensional image. In this method, a three-dimensionally shaped model of an object is represented by a set of line segments (wire frame model), and assuming that approximate position and orientation of the object are known, three-dimensional projection images of the line segments are fitted to the edges detected on the image, thereby measuring the position and orientation of the object.

With the above-described model fitting method, a correspondence between measurement data and the model is retrieved, and a difference between the correspondence pair elements is minimized. However, due to various factors such as a noise in the measurement data, or an error in the initial position and orientation estimation value, a correspondence that is obviously an error may be detected. A group of methods called robust estimation is used, in which a small weight is set for such an obvious error (hereinafter referred to as an "outlier"), thereby preventing the outlier from causing an adverse effect on the estimation results. A typical method of the robust estimation is M estimation.

Also, there are conventional object recognition techniques in which the type or an individual piece of an object is identified by matching a feature model of the object with a feature detected from an image. For example, in Lowe, D. G., "Object Recognition from Local Scale-Invariant Features", Proc. of IEEE International Conference on Computer Vision, pp. 1150-1157, 1999, an object recognition method is disclosed that uses a method for extracting local image feature points, which is called SIFT (scale-invariant feature transform), as image features.

When an object targeted for estimation of the position and orientation or object recognition is disposed under illumination in order to capture an image of the target object, part of the target object or other objects may block the illumination light, thereby causing a shadow. From the image obtained by capturing the image of that scene, it is highly likely that an image feature is detected in the image region corresponding to the shadow, in particular, in a boundary portion between the shadow region and the non-shadow region. This is because a large gradient of the luminance level occurs at the boundary.

Then, when the correspondence between the feature described in the model and an image feature is searched for in order to perform fitting or matching between the object model and image data, a feature of the model may be erroneously associated with a pseudo image feature caused by the shadow. If such an erroneous correspondence occurs, various problems occur such as a failure in the position and orientation estimation processing or the object recognition processing, or a reduction in the accuracy of the position and orientation estimation or the object recognition accuracy.

Even if the above-described robust estimation is applied to such erroneous correspondence with the pseudo image feature, the effect of the erroneous correspondence is not necessarily mitigated. In the robust estimation, the weight coefficient with which each correspondence pair influences the processing results is adjusted based on a certain evaluation value for measuring the distance between the correspondence pair elements (for example, the distance on the image between the correspondence pair elements). Specifically, the weight coefficient is set to be higher as the evaluation value of the distance is larger. Note that when the distance evaluation value is calculated, whether the corresponding image feature is within the shadow region is not considered, and thus it is not possible to prevent the situation in which a large weight coefficient is set for a feature point within the shadow region. Accordingly, even if an erroneous corresponding point is extracted from the shadow region, it is difficult for the robust estimation to remove an adverse effect caused by the erroneous corresponding point. The robust estimation is a method for excluding outliers based on the numerical calculation, and does not involve geometric/optical judgment as to whether the image feature is affected by the shadow. For this reason, if elements of an erroneous correspondence pair accidentally have a small distance therebetween, it is difficult to mitigate the adverse effect caused by that pair.

In view of the above-described issues, the present invention provides a technique for reducing an effect of a pseudo image feature that is extracted from an image region corresponding to a region where a shadow is formed, and improving stability/accuracy of fitting/matching.

SUMMARY OF INVENTION

According to one aspect of the present invention, there is provided a position and orientation measurement apparatus comprising: storage means for storing a three-dimensional model of a target object; two-dimensional image obtaining means for obtaining a two-dimensional image of the target object; extraction means for extracting an occluded region in which illumination irradiated onto the target object is occluded in the two-dimensional image; projection means for projecting a line segment that constitutes the three-dimensional model onto the two-dimensional image based on approximate values of position and orientation of the target object; association means for associating a point that constitutes the projected line segment with a point that constitutes an edge in the two-dimensional image as a pair; determination means for determining whether the associated point that constitutes an edge in the two-dimensional image is present within the occluded region; and position and orientation measurement means for measuring the position and orientation of the target object based on a distance on the two-dimensional image between the point that constitutes the projected line segment and the point that constitutes the edge in the two-dimensional image, the points being associated as the pair, and a result of the determination made by the determination means with respect to the point that constitutes the edge in the two-dimensional image.

Further features of the present invention will be apparent from the following description of exemplary embodiments with reference to the attached drawings.

BRIEF DESCRIPTION OF DRAWINGS

FIG. 3 is a flowchart illustrating the flow of the processing according to the first embodiment.

DESCRIPTION OF EMBODIMENTS

Figure 1A:
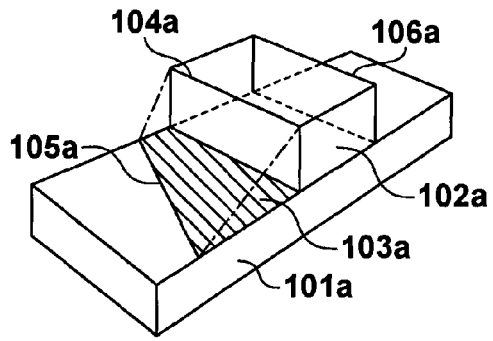
FIG. 1A is a schematic diagram three-dimensionally illustrating the shape of a measurement target object.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the present embodiment, a position and orientation measurement apparatus that estimates the position and orientation of an object by fitting a known three-dimensionally shaped model of an object to the image obtained by capturing the image of the object is described. The position and orientation of a target object is measured, the three-dimensional shape information of a three-dimensional model of the target object being known. An object whose position and orientation are estimated is hereinafter referred to as a "measurement target object".

The position and orientation of the measurement target object are estimated as described below. First, feature points on the image that correspond to a plurality of feature points on the shape model are retrieved, and the position and orientation of the measurement target object are optimized such that the sum of distances on the image is the smallest, each distance being a distance between the points corresponding to each other ("corresponding point pair"). At this time, by causing the effects that the respective corresponding point pairs have on the position and orientation measurement to vary, it is possible to reduce contribution by a corresponding point pair to the position and orientation measurement, which may lead to an erroneous position and orientation measurement. For example, the position and orientation that achieve the smallest sum total of values, each of the values being obtained by multiplying the distance on the two-dimensional image between a point that constitutes a projected line segment obtained by projecting a line segment constituting the three-dimensional model and a point that constitutes an edge on the two-dimensional image by a weight coefficient, are measured as the position and orientation of the target object. At this time, the weight coefficient for the corresponding point pair that may cause an adverse effect can be set to a small value.

In the present embodiment, two types of images of the measurement target object are captured. "Two types" refers to a range image and a grayscale image. Note that a color image may be captured instead of a grayscale image. In such a case, the two types refer to a range image and a color image.

The range image is different from a normal two-dimensional image in that the distance from the image capturing apparatus to an object is stored in each pixel. In the present embodiment, the range image is captured by a pattern projection method. Specifically, an illumination pattern such as a stripe pattern formed by dark area and bright area is projected onto a measurement target object, the image of the scene is captured from a direction different from the direction of illumination, and the distance is calculated based on the principle of triangulation. Note that the method for measuring the distance is not limited to the pattern projection method, and other methods may be used as long as the method is an arbitrary active illumination method based on the principle of triangulation. With such a distance measurement method based on triangulation, since the position and direction of the camera are different from those of the illumination, there may be a case in which a space region that is in the captured image is not irradiated by the light from the illumination, as a result of the light being occluded. The projected illumination pattern is not observed for such a region, and therefore the distance cannot be measured. In the range image measurement apparatus assumed to be used in the present embodiment, the value of the pixels for which measurement cannot be performed is set to "0". Possible methods for indicating impossibility of measurement include a method in which the corresponding pixel value is set to a value that is not ordinarily used as the distance value (for example, "0" as in the present embodiment), a method in which a flag value indicating whether the distance measurement is impossible is assigned to each pixel, separately from the range image, and the like. In any case, pixels for which distance measurement is impossible can be easily identified by referencing the pixel values or flag values.

The grayscale image is captured by using an image capturing unit and an illumination unit of the range image measurement apparatus. When a grayscale image is captured, the target object is irradiated by even illumination that does not include a light/dark pattern. Since the range image and the grayscale image are captured by the same camera, pixels having the same two-dimensional coordinates are at the same location in the three-dimensional space. Accordingly, the region on the range image where the pattern light is occluded and distance measurement becomes impossible matches the region on the grayscale image where a shadow is formed.

Figure 1B:
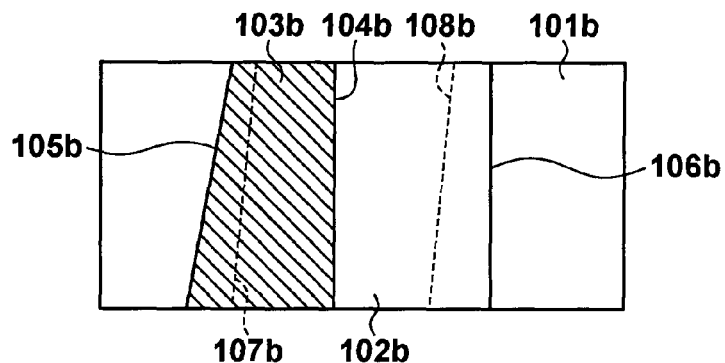
FIG. 1B is a diagram illustrating a portion corresponding to the measurement target object extracted from a grayscale image obtained by capturing the image of the measurement target object.

First, with reference to FIGS. 1A and 1B, a schematic diagram illustrating the principle of the embodiments of the present invention will be described. FIG. 1A is a schematic diagram that three-dimensionally illustrates the shape of the measurement target object. Also, FIG. 1B is a diagram illustrating a portion corresponding to the measurement target object extracted from the grayscale image obtained by capturing the image of the measurement target object. Here, an image obtained by capturing the image of the measurement target object from above is shown.

In FIG. 1A, a measurement target object 101a is an object serving as a measurement target. The measurement target object 101a includes a projection portion 102a. Due to the projection portion 102a, light from the illumination unit of the range image measurement apparatus is occluded, and a shadow is formed in a region 103a. On the grayscale image shown in FIG. 1B, the measurement target object 101a corresponds to a region 101b, the projection portion 102a corresponds to a region 102b, and the region 103a where a shadow is formed corresponds to a region 103b. A line segment 104a corresponds to a line segment 104b, a line segment 105a corresponds to a line segment 105b, and a line segment 106a corresponds to a line segment 106b. Note that in the following description, the region where a shadow is formed on the grayscale image, such as the region 103b, is referred to as an "occluded region". The region 103a corresponds to a portion onto which pattern light is not projected when the range image is captured, and thus the distance measurement is impossible in the region 103a. Also, the pixels of the range image and the pixels of the grayscale image correspond one-to-one. That is, the occluded region 103b can be detected by detecting the region in the range image where the pixel value is "0", which indicates impossibility of measurement.

In the method according to the present embodiment, as points on the shape model used in the calculation for estimating the position and orientation, points on the line segments constituting the shape model are used. In order to obtain feature points on the image corresponding to the points on the line segment 104a, a plurality of control points are set on a line segment 107b that is obtained by projecting the line segment 104a on the image based on the approximate position and orientation of the measurement target object, thereby searching for image edges that are closest to the control points. Normally, the line segment 104b corresponds to the line segment 104a. However, in the case of FIG. 1B, since the line segment 105b is closer to the line segment 107b, points on the line segment 105b are detected, which are erroneous corresponding points.

In view of this, whether the corresponding point found by the search is within the occluded region is determined, and if the corresponding point is within the occluded region, the contribution degree (weight coefficient) with respect to that corresponding point in the position and orientation calculation is set to a relatively low value. In contrast, when feature points on the image that correspond to the points on the line segment 106a of the model are searched for, edges on the image that are closest to the points on a line segment 108b obtained by projecting the line segment 106a on the image are retrieved. In the case of FIG. 1B, the search result is a group of points on the line segment 106b. Since these points are outside the occluded region, the contribution degree (weight coefficient) in the position and orientation calculation with respect to the corresponding point pairs, the points of the pairs being present on the model line segment 106a and the image line segment 106b, is set to a relatively large value.

Figure 1C:
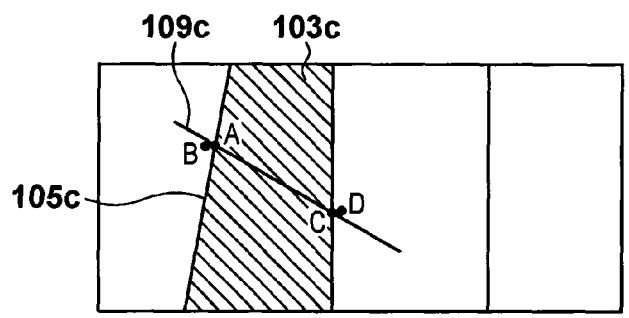
FIG. 1C is a diagram for illustrating extraction of a shadow edge boundary region.

By controlling the weight coefficient used in the position and orientation measurement depending on whether the retrieved corresponding point on the image is inside the occluded region, it is possible to reduce the possibility that the boarder of the shadow, which is pseudo edges, causes an adverse effect, thereby inviting a failure in the position and orientation calculation, or a reduction in the calculation accuracy. Note that FIG. 1C will be described below.

Figure 2A:
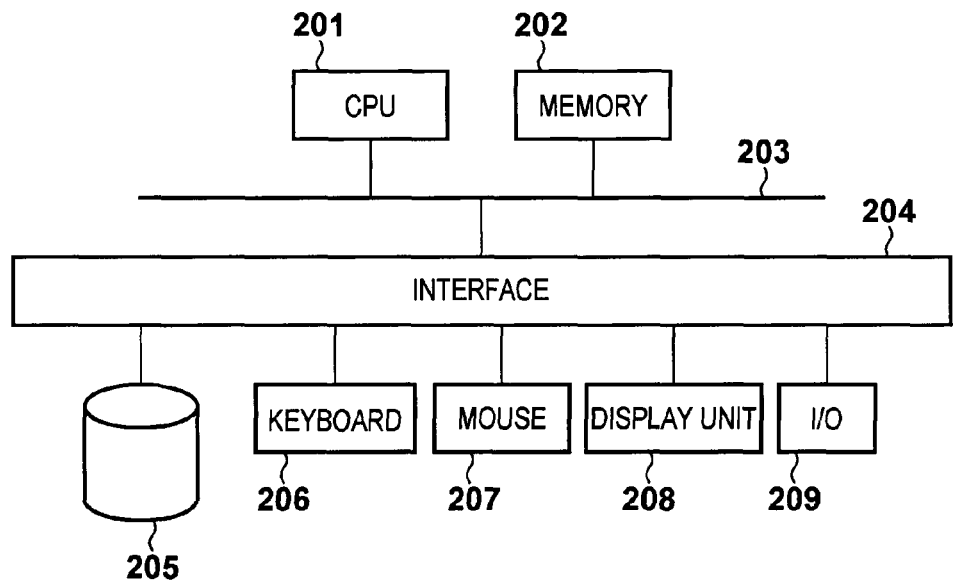
FIG. 2A is a diagram illustrating a hardware configuration of a position and orientation measurement apparatus.

Next, with reference to FIG. 2A, the hardware configuration of the position and orientation measurement apparatus according to the present embodiment will be described. The position and orientation measurement apparatus includes a CPU 201, a memory 202, a bus 203, an interface 204, an external storage device 205, a keyboard 206, a mouse 207, a display unit 208, and a data input/output unit 209.

The CPU 201 controls the operations performed by the processing units described below. The memory 202 stores programs and data used for the operation of the CPU 201. The bus 203 performs data transfer between the constituent modules. The interface 204 is an interface between the bus 203 and various types of devices. The external storage device 205 stores programs and data loaded to the CPU 201. The keyboard 206 and the mouse 207 constitute an input device for activating programs or designating operations of the programs. The display unit 208 displays processing operation results. The data input/output unit 209 receives and outputs data from and to the outside of the apparatus. The range image measurement apparatus is connected to the position and orientation measurement apparatus according to the present embodiment via the data input/output unit 209.

Figure 2B:
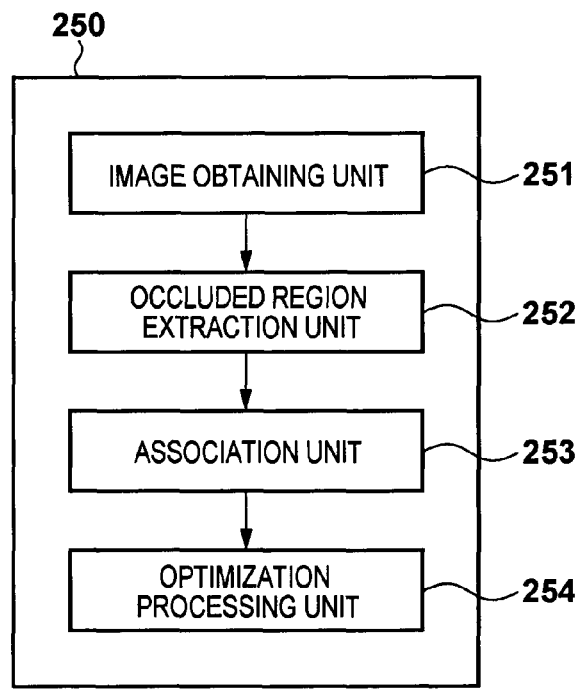
FIG. 2B is a diagram illustrating a functional configuration of a position and orientation measurement apparatus according to the first embodiment.

With reference to FIG. 2B, the functional configuration of a position and orientation measurement apparatus 250 will be described. The position and orientation measurement apparatus 250 includes an image obtaining unit 251, an occluded region extraction unit 252, an association unit 253 and an optimization processing unit 254. The image obtaining unit 251 obtains range image data and grayscale image data from a range image measurement apparatus, which is not shown in the drawings and is connected to the data input/output unit 209, and stores the obtained data in the memory 202. The occluded region extraction unit 252 extracts an occluded region on the grayscale image. The association unit 253 associates the model of the measurement target object with an image feature. The optimization processing unit 254 corrects approximate position and orientation of the measurement target object, thereby calculating optimized position and orientation of the measurement target object.

With reference to FIG. 3, the flowchart illustrating the flow of the processing according to the first embodiment will be described. In step S301, initial setting of data used in the processing is performed. Specifically, three-dimensional model data of the measurement target object, approximate value data of the position and orientation of the measurement target object, and camera parameters (for example, the position of the principal point, or the focal length) for the image capturing unit of the range image measurement apparatus are loaded from the external storage device 205 to the memory 202. Note that in the following description, the image capturing unit is also referred to as a "camera".

A three-dimensional model is defined by a set of vertices and a set of line segments connecting vertices. Accordingly, the three-dimensional model data is configured by the identification numbers and the coordinates of the vertices, the identification numbers of the line segments, and the identification numbers of vertices on the ends of the line segments.

The approximate position and orientation data of the measurement target object obtained by the approximate value obtaining processing in step S301 indicates approximate values of the position and orientation of the measurement target object with respect to the position and orientation measurement apparatus. Here, the position and orientation of the object with respect to the position and orientation measurement apparatus refer to the position and orientation of the object in the camera coordinate system. Although an arbitrary method can be used for calculating the approximate position and orientation, in the present embodiment, assuming that the position and orientation are continuously measured in the time axis direction, the previous measurement value (value at the point in time of the previous measurement) is used as the approximate position and orientation value. The initial approximate position and orientation can be calculated by using a method disclosed in Japanese Patent Laid-Open No. 01-009307, for example. Also, the camera parameters for the image capturing unit of the range image measurement apparatus are calibrated in advance, by using a method disclosed in Z. Zhang, "A flexible new technique for camera calibration", IEEE Transactions on Pattern Analysis and Machine Intelligence, vol. 22, no. 11, pp. 1330-1334, 2000, for example.

In step S302, the image obtaining unit 251 obtains range image data and two-dimensional image data (grayscale image data or color image data) from the range image measurement apparatus, which is not shown in the drawings and is connected to the data input/output unit 209, and stores the obtained data in the memory 202.

In step S303, the occluded region extraction unit 252 extracts an occluded region from the grayscale image obtained in the two-dimensional image obtaining processing in step S302. Specifically, with reference to the range image data obtained by the range image obtaining processing in step S302, pixels whose values are "0", which indicates impossibility of measurement, are extracted. The extraction results are stored in the memory 202 as a binary image having the same size as the grayscale image and the range image (hereinafter referred to as an "occluded region image"). In the occluded region image, each pixel has a value of "1" or "0", and the pixel having the value "1" corresponds to the pixel within the occluded region, and the pixel having the value "0" corresponds to the pixel outside the occluded region.

In step S304, the association unit 253 associates the model of the measurement target object with an image feature. The processing in step S304 will be described below in detail.

In step S305, the optimization processing unit 254 corrects the approximate position and orientation of the measurement target object, thereby calculating the position and orientation of the measurement target object. The processing in step S305 will be described below in detail.

Figure 4:
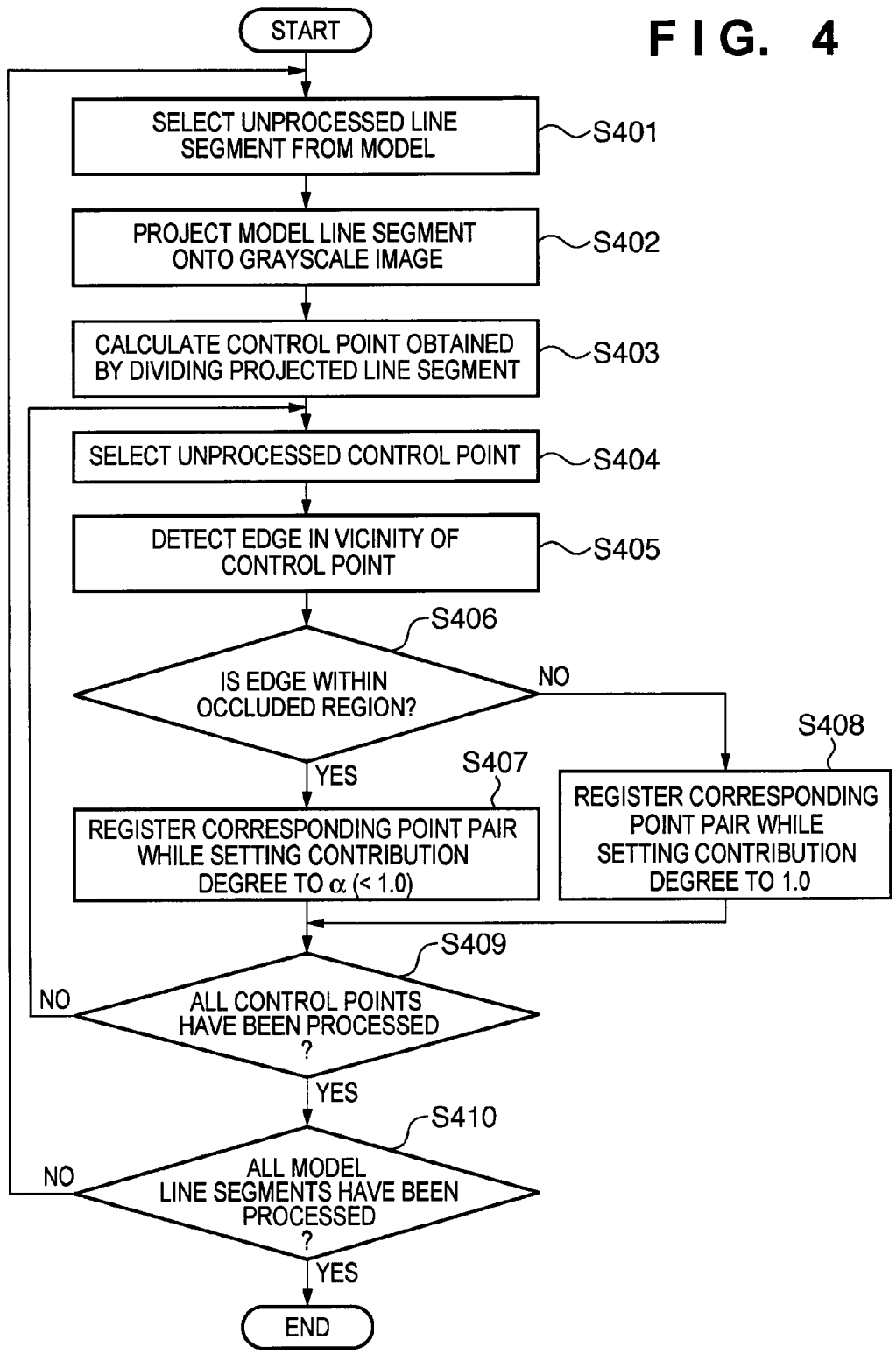
FIG. 4 is a flowchart illustrating details of processing for associating a model of the measurement target object and an image feature.

Here, with reference to FIG. 4, the flowchart illustrating details of the processing for associating the model of the measurement target object with the image feature, which is performed in step S304, will be described. In this processing, line segments that constitute the three-dimensional model are associated with edges on the two-dimensional image (grayscale image or color image). As a method for performing this association operation, a method similar to that disclosed in H. Wuest, F. Vial, and D. Stricker, "Adaptive line tracking with multiple hypotheses for augmented reality," Proc. The Fourth Int'l Symp. on Mixed and Augmented Reality (ISMAR05), pp. 62-69, 2005 is used.

In step S401, one line segment of the three-dimensional model for which processing for associating a line segment constituting the model with edges on the two-dimensional image (grayscale image or color image) has not been performed is selected.

In step S402, by using the approximate position and orientation of the measurement target object and the internal parameters of the camera that have been input in step S301 in FIG. 3, a projection image of the line segment selected in step S401 obtained by projecting the image onto the two-dimensional image is calculated. The projection image of the line segment forms a line segment also on the image.

In step S403, control points are set on the projected line segment calculated in step S402. Here, the control points refer to the points on the projected line segment that equally divide the projected line segment.

The control point stores two-dimensional coordinates of the control point and information on the two-dimensional direction of the line segment, which are obtained as a result of projection, and three-dimensional coordinates of the control point on the three-dimensional model and information on the three-dimensional direction of the line segment. The control point also stores information on the three-dimensional attribute that is stored by the line segment of the three-dimensional model, the line segment being the original line segment of the projected line segment divided by the control points. The total number of the control points of each projected line segment is represented by "n", and each control point is indicated as $DF_i$ (i=1, 2, ..., n).

In step S404, out of the control points $DF_i$ (i=1, 2, ..., n) of the projected line segment calculated in step S403, one control point for which a corresponding point has not been detected is selected.

In step S405, an edge in the two-dimensional image that corresponds to the control point selected in step S404 is detected.

Figure 8A:
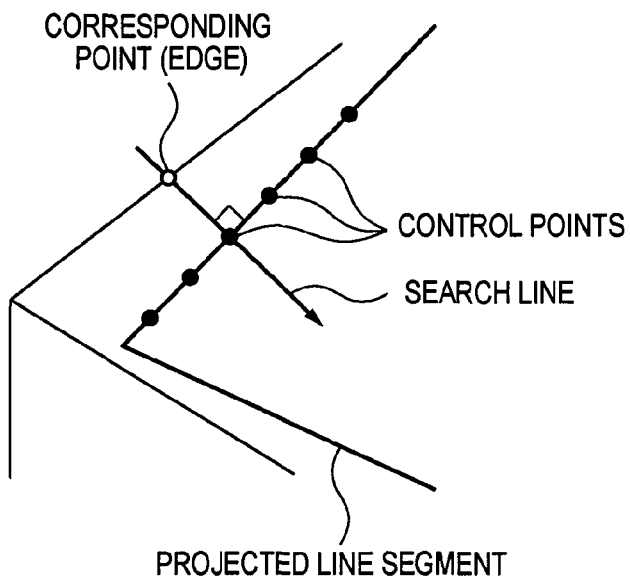
FIGS. 8A and 8B are diagrams each illustrating the processing for detecting edges in a two-dimensional image.
Figure 8B:
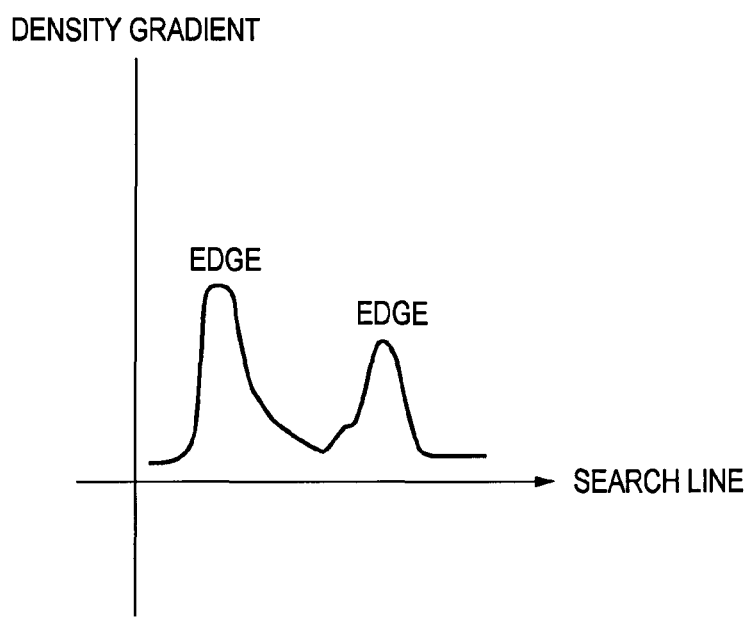

With reference to FIGS. 8A and 8B, the method for detecting an edge in the two-dimensional image in step S405 will be described. Edge detection is performed by calculating an extreme value from the density gradient on the grayscale image, on the search line (normal line direction of the control point in the two-dimensional direction) of the control point $DF_i$, as shown in FIG. 8A. The edge is present in the position where the density gradient has the extreme value on the search line. In the case where only one edge has been detected on the search line, that edge serves as the corresponding point. Also, in the case where a plurality of edges have been detected on the search line, as shown in FIG. 8B, the edge that is the closest to the control point serves as the corresponding point.

In step S406, the two-dimensional coordinates of the corresponding point detected in step S405 are referenced, and it is determined whether that corresponding point is within the range of the occluded region extracted in step S303 in FIG. 3. Specifically, the value of the pixel in the occluded region image that has the same coordinates as the corresponding point is referenced, and if the value is "1", the corresponding point is determined to be within the occluded region, and if the value is "0", the corresponding point is determined to be outside the occluded region. If the corresponding point is determined to be within the range of the occluded region ("YES" in step S406), the procedure proceeds to step S407. In contrast, if the corresponding point is determined to be outside the range of the occluded region ("No" in step S406), the procedure proceeds to step S408.

In step S407, the two-dimensional coordinates of the control point selected in step S404, the two-dimensional coordinates of the edge detected in step S405, and a value $\alpha$ (<1.0)

of the weight coefficient of the corresponding point pair in the position and orientation calculation are stored in the memory 202 as corresponding point pair data.

On the other hand, in step S408, the two-dimensional coordinates of the control point selected in step S404, the two-dimensional coordinates of the edge detected in step S405, and the weight coefficient value of the corresponding point pair in the position and orientation calculation, which is 1.0, are stored in the memory 202 as the corresponding point pair data.

In step S409, it is determined whether the corresponding edge has been detected for all the control points set in step S403. If it is determined that the corresponding edge has been detected for all the control points ("YES" in step S409), the procedure proceeds to step S410. In contrast, if it is determined that the corresponding edge has not been detected for all the control points ("NO" in step S409), the procedure returns to step S404.

In step S410, it is determined whether edge detection has been completed for all the line segments on the model. If it is determined that edge detection has been completed for all the line segments on the model ("YES" in step S410), the processing ends. The entire processing of step S304 in FIG. 3 thereby ends. In contrast, if it is determined that edge detection has not been completed for all the line segments on the model ("NO" in step S410), the procedure returns to step S401.

By the processing described above, a pair of a point on the line segment on the model and an edge on the image corresponding to the point is obtained, and if the edge of the pair is within the occluded region, the weight coefficient of that pair in the position and orientation calculation is set to a relatively low value.

Lastly, the processing for optimizing the value of the position and orientation of the measurement target object (processing in step S305) will be described in detail by using the corresponding point pair detected in step S304.

In step S305, the approximate position and orientation of the measurement target object is corrected by iterative operation using the nonlinear optimization calculation, thereby calculating the position and orientation of the measurement target object. Here, out of all the control points DFi on the three-dimensional line segments, the total number of the control points for which corresponding edge candidates have been obtained in step S304 is indicated by Lc. Also, the horizontal direction and the vertical direction of the image are respectively set to the x axis and the y axis. Also, the coordinates of a control point projected on the image are indicated as $(u_0, v_0)$. Then, the tilt on the image that corresponds to the direction of the control points is indicated by a tilt θ relative to the x axis. The tilt θ is calculated as the tilt of the straight line that is formed by connecting the two-dimensional coordinates on the captured image of the end points (start point and end point) of the projected three-dimensional line segment. The normal vector on the image of the straight line including the control points is expressed as (sin θ), −cos θ). Also, the coordinates on the image of the corresponding point of the control point are indicated as (u', v'). Here, the equation of the straight line that passes the point (u, v) and has a tilt θ is expressed as Equation 1 below.

Equation 1

$$x \sin\theta - y \cos\theta = u \sin\theta - v \cos\theta \qquad (1)$$

The coordinates on the captured image of the control point changes depending on the position and orientation of the image capturing apparatus. Also, the position and orientation of the image capturing apparatus has six degrees of freedom. Here, the parameter for indicating the position and orientation of the image capturing apparatus is indicated by a vector s. The vector s is a six-dimensional vector, and is composed of three elements that indicate the position (for example, x, y and z) of the image capturing apparatus and three elements that indicate the orientation thereof. The three elements that indicate the orientation may be expressed by, for example, Euler angle, a three-dimensional vector in which the direction represents the rotation axis and the magnitude represents the rotation angle, or the like. The coordinates (u, v) on the image of the control point may be approximated as Equation 2 by performing first-order Taylor expansion in the vicinity of the coordinates $(u_0, v_0)$.

Equation 2

$$\left. \begin{array}{l} u \approx u_0 + \sum_{i=1}^{6} \dfrac{\partial u}{\partial s_i} \Delta s_i \\ v \approx v_0 + \sum_{i=1}^{6} \dfrac{\partial v}{\partial s_i} \Delta s_i \end{array} \right\} \qquad (2)$$

The method for deriving partial derivatives of u and v in Equation 2 is widely known as disclosed in, for example, K. Satoh, S. Uchiyama, H. Yamamoto, and H. Tamura, "Robust vision-based registration utilizing bird's-eye view with user's view," Proc. The 2nd IEEE/ACM International Symposium on Mixed and Augmented Reality (ISMAR03), pp. 46-55, 2003, and will not be described here in detail. By inserting Equation 2 to Equation 1, the following Equation 3 is obtained.

Equation 3

$$x\sin\theta - y\cos\theta = \left(u_0 + \sum_{i=1}^{6} \dfrac{\partial u}{\partial s_i} \Delta s_i\right)\sin\theta - \left(v_0 + \sum_{i=1}^{6} \dfrac{\partial v}{\partial s_i} \Delta s_i\right)\cos\theta \qquad (3)$$

Here, a correction value Δs of a position and orientation s of the image capturing apparatus is calculated such that the straight line indicated by Equation 3 passes the coordinates on the image (u', v') of the corresponding point of the control point.

Equation 4

$$\sin\theta \sum_{i=1}^{6} \dfrac{\partial u}{\partial s_i} \Delta s_i - \cos\theta \sum_{i=1}^{6} \dfrac{\partial v}{\partial s_i} \Delta s_i = d - r_0 \qquad (4)$$

Note that $r_0 = u_0 \sin\theta - v_0 \cos\theta$ (=constant) and $d = u' \sin\theta - v' \cos\theta$ (=constant). Since Equation 4 is established for Lc number of control points, the linear simultaneous equations with respect to the correction value Δs as expressed in Equation 5 are established.

Equation 5

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_1 \frac{\partial u_2}{\partial s_1} - \cos\theta_1 \frac{\partial v_2}{\partial s_1} & \sin\theta_2 \frac{\partial u_2}{\partial s_2} - \cos\theta_1 \frac{\partial v_2}{\partial s_2} & \cdots & \sin\theta_2 \frac{\partial u_2}{\partial s_6} - \cos\theta_1 \frac{\partial v_2}{\partial s_6} \\ \vdots & \vdots & \ddots & \vdots \\ \sin\theta_{L_c} \frac{\partial u_{L_c}}{\partial s_1} - \cos\theta_{L_c} \frac{\partial v_{L_c}}{\partial s_1} & \sin\theta_{L_c} \frac{\partial u_{L_c}}{\partial s_2} - \cos\theta_{L_c} \frac{\partial v_{L_c}}{\partial s_2} & \cdots & \sin\theta_{L_c} \frac{\partial u_{L_c}}{\partial s_6} - \cos\theta_{L_c} \frac{\partial v_{L_c}}{\partial s_6} \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ d_{L_c} - r_{L_c} \end{bmatrix} \quad (5)$$

Here, Equation 5 is simply expressed as Equation 6.

Equation 6

$$J\Delta s = E \quad (6)$$

Here, the weight coefficient set in step S304 for each corresponding point pair, that is, a pair of each control point and the edge corresponding thereto, is assumed to be $w_i$. Here, a weighting matrix W is defined as expressed in Equation 7.

Equation 7

$$W = \begin{bmatrix} w_1 & & & 0 \\ & w_2 & & \\ & & \ddots & \\ 0 & & & w_{L_c} \end{bmatrix} \quad (7)$$

The weighting matrix W is a square matrix whose components are all "0" except for diagonal components, and the weight $w_i$ is assigned to the diagonal components. Equation 6 is transformed to Equation 8 by using this weighting matrix W.

Equation 8

$$WJ\Delta s = WE \quad (8)$$

When the correction value Δs is obtained by solving Equation 8 using the Gauss-Newton method or the like, Equation 9 is obtained.

Equation 9

$$\Delta s = (J^T W J)^{-1} J^T W E \quad (9)$$

The approximate values of the position and orientation of the model are corrected by the correction value Δs calculated in this manner, thereby the position and orientation are updated.

Next, it is determined whether the iterative operation of the position and orientation of the object has converged. In the case where the correction value Δs is sufficiently small, the sum total of errors r−d is sufficiently small, or the sum total of the errors r−d does not change, it is determined that the calculation of the position and orientation of the object has converged. If it is determined that the calculation has not been converged, the tilt θ of the line segment, $r_0$, and d, and partial derivatives of u and v are calculated again by using updated position and orientation of the object, and the correction value Δs is again calculated by using Equation 8.

The results of the position and orientation of the object obtained in this manner are stored in the memory 202, or output to an exterior apparatus via the data input/output unit 209.

Note that in this case, the Gauss-Newton method is used as the nonlinear optimization method. However, the nonlinear optimization method is not limited thereto, and other nonlinear optimization methods may be used, such as the Newton-Raphson method, the Levenberg-Marquardt method, the steepest descent method, the conjugate gradient method, and the like. This completes the description of the processing for optimizing the position and orientation of the object performed in step S305.

By performing the above-described processing, it becomes possible to determine whether a feature point on the grayscale image that is necessary for calculating the position and orientation is a pseudo feature point that has been generated due to the shadow caused by the illumination. Then, by setting the weight coefficient of the pseudo feature point in calculating the position and orientation to a relative low value, it becomes possible to reduce an effect of noise, thereby reducing the risk of a failure of the position and orientation calculation or a reduction in the accuracy of the position and orientation estimation.

Note that the present embodiment is not limited to the configuration described above, and there are various variations thereof.

In the above description, determination as to whether an edge is within the occluded region is made after the edge is detected. However, the occluded region may be excluded from the target of the edge detection processing. In this case, the corresponding points that correspond to the line segments of the model do not include an edge in the occluded region. This is equivalent to setting the weight coefficient for the edges in the occluded region to "0" in the above description. Since the edge detection is not performed in the occluded region, the processing speed can be increased.

Also, in the above description, one edge is detected for one control point on the projected line segment of the model line segment, and thus it is possible that the detected edge is present in the occluded region. However, a configuration may be such that a plurality of edges are detected for one control point, and the edge that is outside the occluded region and closest to the control point is selected as the corresponding point.

Also, in the above description, the range image and the grayscale image are captured by using the same camera and illumination, and thus there is no shift in the position or the direction. Even if there is a positional or directional shift in either the camera or the illumination, or both, if it is a small shift, a method similar to that described above can be used. Also, if there is a shift, it is possible to expand the measurement-impossible region in the range image in step S303 so as to make the expanded region the occluded region.

Also, in the above description, a three-dimensional line segment model is used as the model of the measurement target object. However, the model is not necessarily limited to the three-dimensional line segment model. There is no limitation to the type of the three-dimensional model as long as three-dimensional line segments can be calculated from the three-dimensional model. For example, a mesh model configured by vertex information and information on planes formed by connecting vertices may be used, or a parametric surface such as NURBS surface may be used. In these cases, it is not possible to directly reference three-dimensional line segment information in shape information, and thus it is necessary to calculate the three-dimensional line segment information at runtime. This processing is performed instead of the three-dimensional line segment projection processing in step S402. Specifically, a three-dimensional model is rendered using computer graphics (CG) based on the approximate position and orientation of the measurement target object, and edges are detected from the rendered result. The control points are obtained such that the detected edges are positioned at equal intervals, as in step S403.

Also, in the above description, the point feature is used as the image feature. However, the image feature is not limited thereto, and the line feature or the surface feature may be used if the feature has a position attribute. Also when the line feature or the surface feature is used as the image feature, in the case where the image feature and the occluded region have an inclusion relation, or where the image feature and the occluded region intersect, the weight coefficient of the corresponding image feature in the position and orientation calculation is set to a relatively low value.

Second Embodiment

In the first embodiment, the weight coefficient in the position and orientation estimation calculation is uniformly set to a relatively low value with respect to corresponding points in the occluded region. However, the possibility that an erroneous corresponding point is detected is not uniform in the occluded region, and the possibility of detection of an erroneous corresponding point is particularly high at the edge portion of the shadow (for example, on the line segment 105$b$ in the example shown in FIG. 1B).

Therefore, in the present embodiment, a region that is located at the edge of the shadow and where a pseudo edge is likely to be detected (hereinafter referred to as a "shadow edge boundary") is extracted, and the weight coefficient in the position and orientation estimation calculation is set to a relatively low value only for the pixels on the shadow edge boundary.

Note that the shadow edge boundary is extracted by utilizing the fact that the shadow edge boundary is further away from the camera than is the projection portion that causes a shadow, that is, has a larger distance value on the range image.

Figure 5:
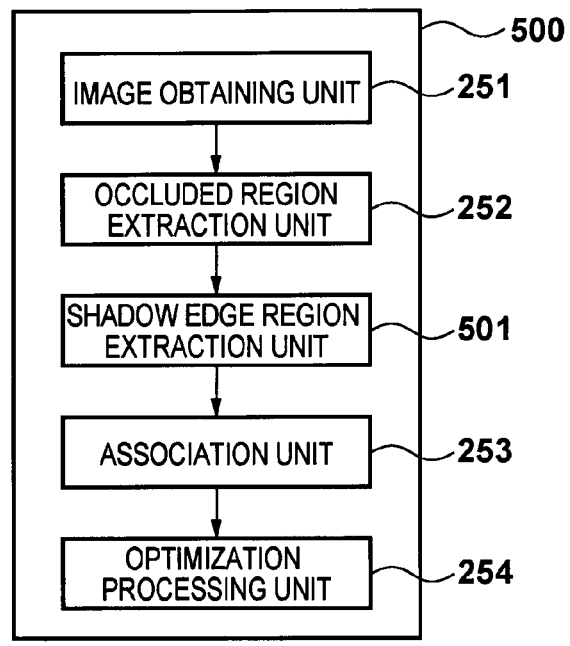
FIG. 5 is a diagram illustrating a functional configuration of a position and orientation measurement apparatus according to a second embodiment.

With reference to FIG. 5, the functional configuration of a position and orientation measurement apparatus 500 according to the second embodiment will be described. The functional configuration of the position and orientation measurement apparatus 500 is similar to that of the first embodiment. The position and orientation measurement apparatus 500 includes an image obtaining unit 251, an occluded region extraction unit 252, an association unit 253, an optimization processing unit 254 and a shadow edge region extraction unit 501. The image obtaining unit 251, the occluded region extraction unit 252, the association unit 253 and the optimization processing unit 254 are the same as those in the first embodiment, and thus description thereof is omitted. The shadow edge region extraction unit 501 extracts a shadow edge boundary.

Figure 6:
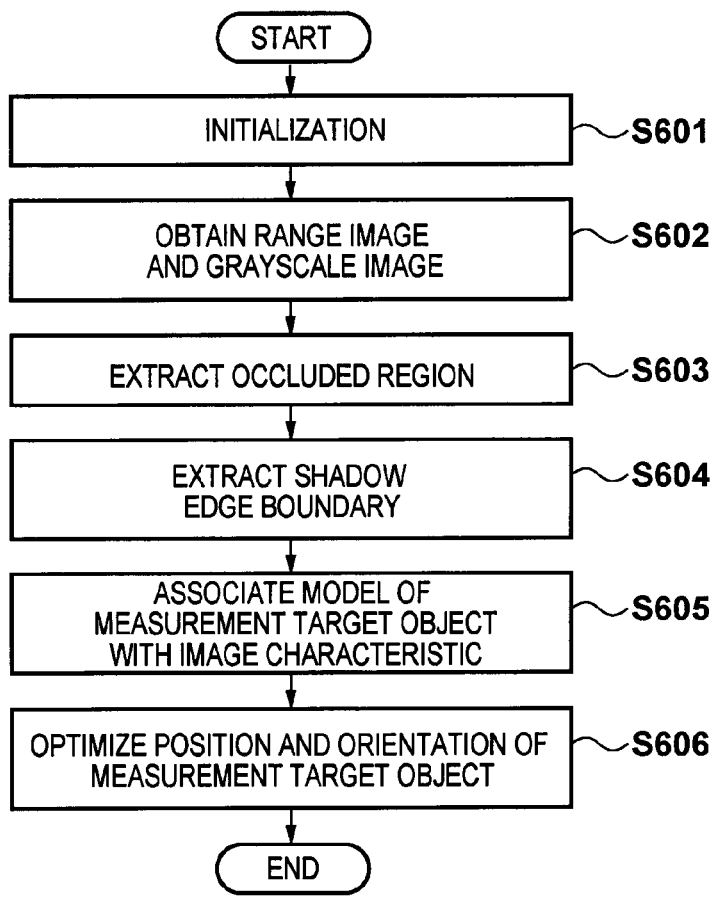
FIG. 6 is a flowchart illustrating the flow of the entire processing according to the second embodiment.

The flowchart illustrating the entire flow of the processing according to the second embodiment will be described with reference to FIG. 6.

In step S601, initial setting of the data used in the processing is performed. Specifically, in addition to the data loaded in step S301 of the first embodiment, projector parameters for the illumination unit of the range image measurement apparatus, not shown in the drawings, and relative position and orientation between the camera and the illumination unit are loaded from the external storage device 205 to the memory 202.

Processing in steps S602 and S603 is the same as the processing in steps S302 and S303 of the first embodiment, respectively.

In step S604, the shadow edge region extraction unit 501 extracts a shadow edge boundary. Details of the processing in step S604 will be described below.

In step S605, the association unit 253 associates the model of the measurement target object with the image feature. The processing in step S605 is substantially the same as the processing in step S304 of the first embodiment. Note that in addition to setting the weight coefficient of the corresponding point in the occluded region to a small value $\alpha$ (<1.0), in the case where the corresponding point is on the shadow edge boundary, the contribution degree of that corresponding point is set to an even smaller value. That is, in the case where the corresponding point is on the shadow edge boundary, a weight coefficient $\beta$ (<$\alpha$), which is smaller than the weight coefficient $\alpha$ (<1.0) set in the case where the edge is included in the occluded region set in the first embodiment, is set as the weight coefficient.

In step S606, the optimization processing unit 254 corrects the approximate position and orientation of the measurement target object, thereby calculating the position and orientation of the measurement target object. The processing in step S606 is the same as the processing in step S305 of the first embodiment.

Here, processing for extracting the shadow edge boundary performed in step S604 will be described in detail. When the uniform light irradiated on the measurement target object when capturing the grayscale image thereof is considered to be planer collective light, the point that is the furthest from the range image measurement apparatus, not shown in the drawings, on the line segment formed by the plane intersecting the region where a shadow is formed on the surface of the measurement target object corresponds to the pixel on the shadow edge boundary. The line that corresponds to this intersecting line segment on the range image or the grayscale image is an epipolar line that passes through the occluded region. Accordingly, in order to determine the shadow edge boundary, the distance values of the points that are in the vicinity of the two intersections between each epipolar line and the contour of the occluded region are compared, and the point having a larger distance value (the point further away from the camera) may be detected. Specific processing will be described with reference to FIGS. 1C and 7.

Figure 7:
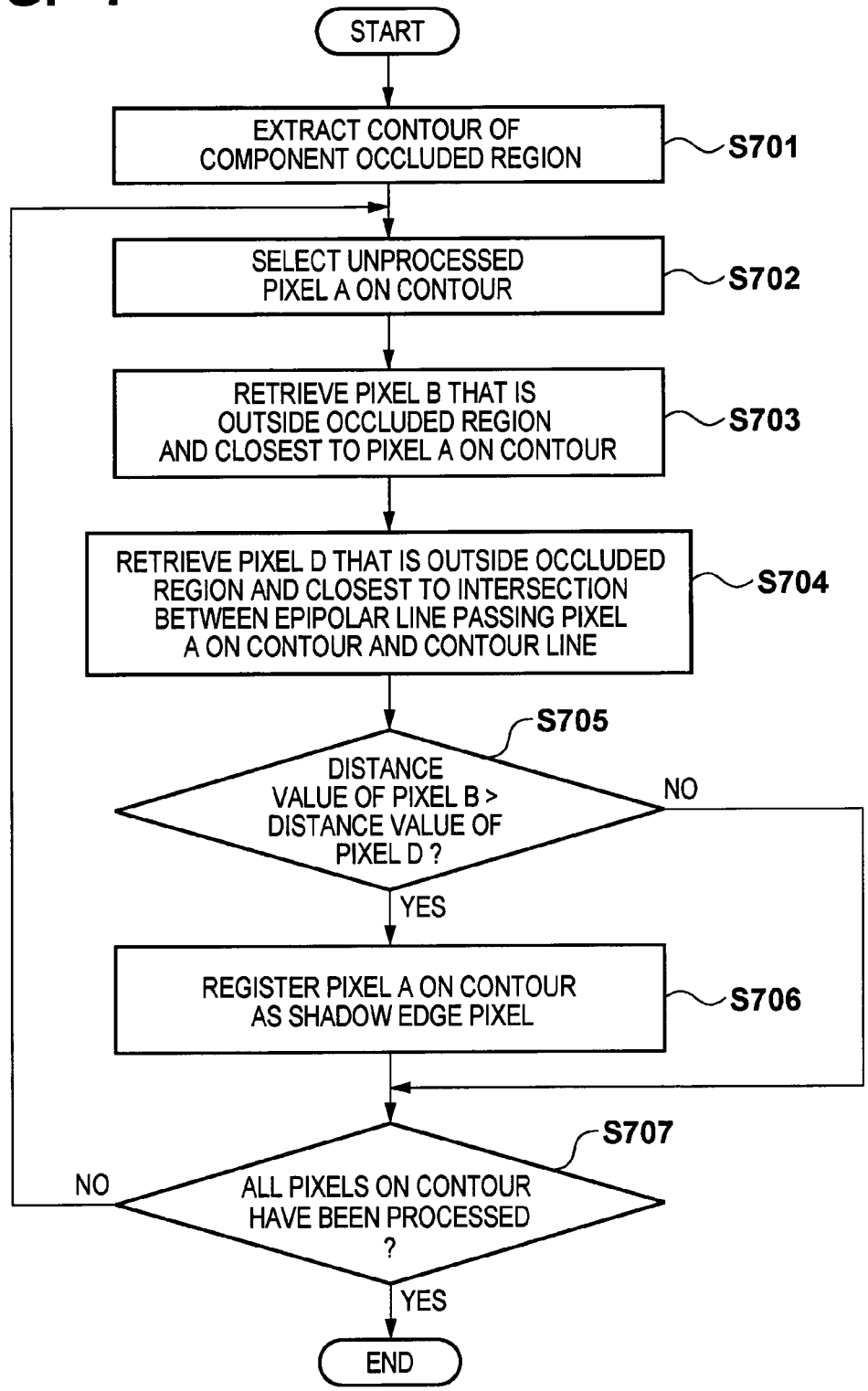
FIG. 7 is a flowchart illustrating a procedure of the processing for extracting a shadow edge boundary.

In the processing for extracting the shadow edge boundary, out of the occluded region extracted in step S603, the processing illustrated in the flowchart in FIG. 7 is performed on each partial region (hereinafter referred to as a "component occluded region") of the occluded region, the partial regions being not connected to each other. In order to separate the component occluded region from the occluded region, labeling is performed with respect to the occluded region image produced in step S603 such that the same label value is assigned to pixels that are connected to each other. As a result, different component occluded regions are assigned mutually different label values as the pixel value. The label value is "1" or a larger value. Note that the pixel value of the region other than the component occluded region is "0".

In step S701, the shadow edge region extraction unit 501 extracts the contour of the component occluded region. A case is considered in which a region 103c in FIG. 1C corresponds to the component occluded region.

In step S702, out of the pixels on the contour extracted by the contour extraction processing in step S701, a single pixel that has not been processed is selected as a first point. This selected pixel is referred to as a "pixel A" on a line segment 105c. Note that the line segment 105c corresponds to the line segment 105b in FIG. 1B.

In step S703, by referencing the occluded region image, the pixel closest to the pixel A selected in step S702 is retrieved as a second point from the pixels that are outside the occluded region (first search processing). The pixel retrieved in step S703 is referred to as a "pixel B". The pixel closest to the pixel A is retrieved from the pixels that are outside the occluded region because the pixel A is located in the component occluded region and thus the distance value of the pixel A may not be obtained.

In step S704, an intersection between an epipolar line 109c that passes the pixel A on the contour that has been selected in step S702, and the contour of the component occluded region extracted in step S701 is detected as a third point. The pixel at this intersection is referred to as a "pixel C". Furthermore, the pixel closest to the pixel C is retrieved as a fourth point from the pixels that are outside the occluded region (second search processing). The pixel retrieved here is referred to as a "pixel D".

In step S705, the distance values of the pixels on the range image that respectively have the same coordinates as the pixel B and the pixel D are referenced, and the distance value corresponding to the pixel B is compared with that corresponding to the pixel D. That is, it is determined whether the distance value corresponding to the pixel B is larger than that corresponding to the pixel D. If it is determined that the distance value corresponding to the pixel B is larger than that corresponding to the pixel D ("YES" in step S705), the procedure proceeds to step S706. In contrast, if it is determined that the distance value corresponding to the pixel B is smaller than or equal to that corresponding to the pixel D ("NO" in step S705), the procedure proceeds to step S707. The example of FIG. 1C corresponds to the case in which the distance value corresponding to the pixel B is larger than that corresponding to the pixel D due to an effect of the projection portion 102a ("YES" in step S705), the procedure proceeds to step S706.

In step S706, the pixel A within the component occluded region that corresponds to the pixel B is registered as a pixel on the shadow edge boundary. That is, the coordinates of the pixel B corresponding to the pixel A are added to the list of pixels on the shadow edge boundary in the memory 202. In this manner, the pixels on the line segment 105c are extracted as the pixels in the shadow edge region.

In step S707, it is determined whether the processing for detecting the shadow edge pixel has been completed with respect to all the pixels on the contour of the component occluded region extracted in step S701. If it is determined that the shadow edge pixel detection processing has been completed ("YES" in step S707), the processing ends. That is, the processing in step S604 ends. In contrast, if it is determined that the shadow edge pixel detection processing has not been completed ("NO" in step S707), the procedure returns to step S702.

In step S605, if it is determined in step S604 that the distance value on the range image corresponding to the second point (pixel B) is larger than that corresponding to the fourth point (pixel D), the weight coefficient that indicates a contribution made by the pair in the position and orientation measurement, the pair being associated with the point that is a first point and constitutes an edge on the two-dimensional image, is set to be smaller than the weight coefficient of other pairs associated with points other than the first point.

By performing the above-described processing, it is possible to detect the position of the pseudo feature point, which is generated due to the shadow caused by the illumination and causes an estimation failure or a reduction in the accuracy of the position and orientation estimation of the measurement target object. As a result, the risk is reduced that a feature point that is not the pseudo feature point is excluded from the position and orientation estimation processing. The method according to the present embodiment can suppress a reduction in the accuracy of the position and orientation estimation more than the method of the first embodiment.

Note that the present embodiment is not limited to the configuration described above, and various variations are present.

In the present embodiment, a configuration is adopted in which after the weight coefficient for the occluded region is set to a low value in the processing in step S603, which corresponds to the processing in step S303 of the first embodiment, the processing for extracting the shadow edge boundary is performed and the weight coefficient for the shadow edge boundary region is set to an even lower value. However, a configuration may be also adopted in which only extraction of the occluded region is performed in step S603 without setting the weight coefficient, and in step S604, the weight coefficient for only the shadow edge boundary region is set to a value lower than the weight coefficient of the points that are not in the shadow edge boundary region (points other than the first point).

In the above description, whether each edge corresponds to the shadow edge pixel is determined after detection of the edge, without excluding the pixels of the shadow edge boundary from the target of the edge detection processing. However, a configuration may be adopted in which the pixels on the shadow edge boundary are excluded from the target of the edge detection processing. In this case, the pixels on the shadow edge boundary are not present in the corresponding points corresponding to the line segments of the model. This is equivalent to setting the weight coefficient of the corresponding points present in the shadow edge boundary to "0".

In the above description, one edge is detected for one control point on the projected line segment of the model line segment. However, a plurality of edges may be detected for one control point, and the edge that is not present on the shadow edge boundary and is closest to the control point may be selected as the corresponding point.

In the above description, the point feature is used as the image feature. However, the image feature is not limited to the point feature. The line feature or the surface feature may be used as the image feature if the feature has a position attribute. Also when the line feature or the surface feature is used as the image feature, in the case where the image feature and the shadow edge boundary have an inclusion relation, or where the image feature and the shadow edge boundary intersect, the weight coefficient of the image feature in the position and orientation calculation is set to a relatively low value.

In the above description, the range image and the grayscale image are captured by using the same camera and illumination, and thus there is no shift in the position or the direction. Even if there is a positional or directional shift in either the camera or the illumination, or both, if it is a small shift, a method similar to that described above can be used. Also, if there is a shift, the shadow edge boundary region may be expanded after step S604.

In the above description, the weight coefficient of the corresponding point in the position and orientation estimation calculation is set to a low value only for the shadow edge boundary. However, although the possibility that an erroneous corresponding point will be detected is lower, there is a possibility that an erroneous correspondence will occur in the occluded region other than the shadow edge boundary. Accordingly, the weight coefficient of the corresponding points in the occluded region may be set to a relatively low value, and the weight coefficient of the corresponding points detected on the shadow edge boundary may be set to a lower value than that of the corresponding points in the occluded region other than the shadow edge boundary.

In the above description, the shadow edge is detected, and the weight coefficient of the corresponding points on the shadow edge boundary in the position and orientation estimation calculation is set to a relatively low value. In contrast, the boundary between the projection portion that causes a shadow on the grayscale and the shadow (for example, the line segment 104b in FIG. 1B, which is hereinafter referred to as a "boundary between the blocking region and the occluded region") may be detected, and the weight coefficient of the corresponding points detected in this boundary may be set to a relatively large value. In this case, the weight coefficient of the corresponding points detected in the occluded region other than the boundary between the blocking region and the occluded region is set to a relatively low value. In addition, the boundary between the blocking region and the occluded region may be expanded.

In addition, the weight coefficient of the corresponding points on the shadow edge boundary may be set to a lower value than that of the corresponding points in the occluded region excluding the shadow edge boundary and the boundary between the blocking region and the occluded region.

Note that in order to extract the boundary between the blocking region and the occluded region, the use of the epipolar line that passes the contour of the occluded region is assumed, as in extraction of the shadow edge. It is sufficient if the distance values corresponding to the pixels that are in the vicinity of the two intersections between the epipolar line and the contour of the occluded region are compared, and the pixel on the contour that has a smaller distance value (the pixel closer to the camera) is selected.

Third Embodiment

The methods of the first embodiment and the second embodiment are for mitigating an adverse effect of the occluded region in the estimation of the position and orientation of the measurement target object. However, the application target of the method of the present invention is not limited to estimation of the position and orientation, and the methods can be applied to arbitrary image processing that uses an image feature that has a position attribute.

For example, in the methods in which an object is recognized by matching a local image feature with a model, by setting the weight coefficient of the image feature within the occluded region in the calculation of similarity with the model to a relatively low value, the possibility of recognition failure can be reduced. Alternatively, the same effect can be obtained by excluding the occluded region from the target of the image feature extraction processing.

Fourth Embodiment

In the foregoing embodiments, the weight coefficient in model fitting or matching processing is set to a low value, or the region where a corresponding point to be excluded from the processing target is present (occluded region, shadow edge portion, boundary between the blocking region and the occluded region) is extracted prior to the processing for retrieving corresponding points. However, whether a corresponding point candidate that has been retrieved is present within or in the vicinity of the region may be determined for each retrieved point.

For example, in the first embodiment, a configuration may be adopted in which when an edge candidate corresponding a control point is retrieved in step S405, the weight coefficient of the edge that has a pixel for which the range image cannot be measured in the vicinity thereof may be set to a relatively low value.

Also, in the second embodiment, with respect to an edge candidate in the vicinity of the pixel for which the range image cannot be measured, it may be determined in step S605 whether that edge candidate belongs to the shadow edge portion based on the distance value on the epipolar line that passes the edge candidate. That is, the distance values at the edges of the region where the range image cannot be measured are compared, and if the edge candidate corresponds to the larger distance value, the edge candidate is determined to belong to the shadow edge portion.

Note that in the second embodiment, the comparison of the distance values can be simply performed on the edge search line, instead of on the epipolar line. Compared with the case in which the epipolar line is used, although the accuracy in determining the shadow edge portion is reduced, the calculation volume is reduced, and thus the speed of processing can be increased.

According to the embodiments described above, it is possible to reduce an effect of a pseudo image feature extracted from the image region corresponding to the region where a shadow is formed, and improve stability and accuracy of the fitting and matching.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185576 filed on Aug. 20, 2010, which is hereby incorporated by reference herein in its entirety.

The invention claimed is:

1. A position and orientation measurement apparatus comprising:
   a storage unit configured to store a three-dimensional model of a target object;
   a two-dimensional image obtaining unit configured to obtain a two-dimensional image of the target object;
   an extraction unit configured to extract an occluded region in which illumination irradiated onto the target object is occluded in the two-dimensional image;
   a projection unit configured to project a geometric feature that constitutes the three-dimensional model onto the two-dimensional image based on approximate values of position and orientation of the target object;

an association unit configured to associate the geometric feature with an image feature in the two-dimensional image;

a determination unit configured to determine whether the associated image feature in the two-dimensional image is on a contour of the occluded region; and a position and orientation measurement unit configured to measure the position and orientation of the target object based on a distance on the two-dimensional image between the projected geometric feature and the associated image feature in the two-dimensional image, in accordance with a determination result by the determination unit.

2. The position and orientation measurement apparatus according to claim 1, wherein the position and orientation measurement unit comprises a setting unit configured to set a weight such that a weight for an image feature that is determined by the determination unit to be on the contour of the occluded region becomes smaller than a weight for an image feature that is not determined by the determination unit to be on the contour of the occluded region, and wherein the position and orientation measurement unit measures the position and orientation of the target object by using a distance obtained by weighting with the weight set by the setting unit.

3. The position and orientation measurement apparatus according to claim 2, further comprising:

a selection unit configured to select a first image feature that constitutes the contour;

a first search unit configured to retrieve a second image feature that is outside the occluded region and has a shortest distance value to the first image feature;

a detection unit configured to detect a third image feature that is an intersection between the contour and an epipolar line that passes the first image feature, and is not the first image feature;

a second search unit configured to retrieve a fourth image feature that is outside the occluded region and has a shortest distance value to the third image feature; and a discrimination unit configured to discriminate which is larger between the distance value on the range image corresponding to the second image feature and the distance value on the range image corresponding to the fourth image feature, wherein the setting unit sets, if the discrimination unit has discriminated that the distance value on the range image corresponding to the second image feature is larger, the weight that corresponds to the first image feature and is associated by the association unit to be even smaller.

4. The position and orientation measurement apparatus according to claim 1, further comprising:

a range image obtaining unit configured to obtain a range image of the target object, wherein the extraction unit extracts a region in which a distance value to the target object cannot be measured in the range image as the occluded region.

5. The position and orientation measurement apparatus according to claim 1, wherein the two-dimensional image is a grayscale image or a color image.

6. A position and orientation measurement apparatus comprising:

a storage unit configured to store a three-dimensional model of a target object;

a two-dimensional image obtaining unit configured to obtain a two-dimensional image of the target object;

an extraction unit configured to extract an occluded region in which illumination irradiated onto the target object is occluded in the two-dimensional image;

a projection unit configured to project a line segment that constitutes the three-dimensional model onto the two-dimensional image based on approximate values of position and orientation of the target object;

an association unit configured to associate a point that constitutes the projected line segment with a point that constitutes an edge in the two-dimensional image as a pair;

a contour extraction unit configured to extract a contour of the occluded region;

a selection unit configured to select a first point that constitutes the contour;

a first search unit configured to retrieve a second point that is outside the occluded region and has a shortest distance value to the first point;

a calculation unit configured to calculate a third point that is an intersection between the contour and an epipolar line that passes the first point;

a second search unit configured to retrieve a fourth point that is outside the occluded region and has a shortest distance value to the third point;

a discrimination unit configured to discriminate which is larger between the distance value on the range image corresponding to the second point and the distance value on the range image corresponding to the fourth point;

a setting unit configured to set, if the discrimination unit has discriminated that the distance value on the range image corresponding to the second point is larger, a weight of the pair corresponding to the first point to be smaller than a weight of the pair corresponding to a point other than the first point; and a position and orientation measurement unit configured to measure position and orientation that achieve a smallest sum total of values, each of the values being obtained by multiplying a distance value on the two-dimensional image between the point that constitutes the projected line segment and the point that constitutes the edge in the two-dimensional image, the points being associated as the pair, by the weight, as the position and orientation of the target object.

7. The position and orientation measurement apparatus according to claim 6, wherein the two-dimensional image is a grayscale image or a color image.

8. A position and orientation measurement method comprising:

a two-dimensional image obtaining step of obtaining a two-dimensional image of a target object;

an extraction step of extracting an occluded region in which illumination irradiated onto the target object is occluded in the two-dimensional image;

a projection step of projecting a geometric feature that constitutes a three-dimensional model of the target object, the three-dimensional model being stored in a storage unit, onto the two-dimensional image based on approximate values of position and orientation of the target object;

an association step of associating the geometric feature with an image feature in the two-dimensional image;

a determination step of determining whether the associated image feature in the two-dimensional image is on a contour of the occluded region; and a position and orientation measurement step of measuring the position and orientation of the target object based on a distance on the two-dimensional image between the projected geometric feature and the associated image feature in the two-dimensional image, in accordance with a determination result in the determination step.

9. A position and orientation measurement method comprising:
   a two-dimensional image obtaining step of obtaining a two-dimensional image of a target object;
   an extraction step of extracting an occluded region in which illumination irradiated onto the target object is occluded in the two-dimensional image;
   a projection step of projecting a line segment that constitutes a three-dimensional model of the target object, the three-dimensional model being stored in a storage unit, onto the two-dimensional image based on approximate values of position and orientation of the target object;
   an association step of associating a point that constitutes the projected line segment with a point that constitutes an edge in the two-dimensional image as a pair;
   a contour extraction step of extracting a contour of the occluded region;
   a selection step of selecting a first point that constitutes the contour;
   a first search step of retrieving a second point that is outside the occluded region and has a shortest distance value to the first point;
   a calculation step of calculating a third point that is an intersection between the contour and an epipolar line that passes the first point;
   a second search step of retrieving a fourth point that is outside the occluded region and has a shortest distance value to the third point;
   a discrimination step of discriminating which is larger between the distance value on the range image corresponding to the second point and the distance value on the range image corresponding to the fourth point;
   a setting step of setting, if it has been discriminated that the distance value on the range image corresponding to the second point is larger, a weight of the pair corresponding to the first point to be smaller than a weight of the pair corresponding to a point other than the first point; and
   a position and orientation measurement step of measuring position and orientation that achieve a smallest sum total of values, each of the values being obtained by multiplying a distance value on the two-dimensional image between the point that constitutes the projected line segment and the point that constitutes the edge in the two-dimensional image, the points being associated as the pair, by the weight, as the position and orientation of the target object.

10. A non-transitory computer-readable storage medium storing a computer program for causing a computer to execute the position and orientation measurement method according to claim 8.

11. A non-transitory computer-readable storage medium storing a computer program for causing a computer to execute the position and orientation measurement method according to claim 9.

12. A position and orientation measurement apparatus comprising:
   a storage unit configured to store a three-dimensional model including three-dimensional shape information of a target object;
   a two-dimensional image obtaining unit configured to obtain a two-dimensional image of the target object;
   a specifying unit configured to specify a shadow edge boundary region, the shadow edge boundary region being a boundary region between an edge portion of a shadow region where an illumination irradiated to the target object in the two-dimensional image is occluded and a non-shadow region that is not the shadow region;
   an association unit configured to associate a geometric feature extracted from the three-dimensional model with an image feature on the two-dimensional image corresponding to the geometric feature, based on the shadow edge boundary region specified by the specifying unit and an approximate value of a position and orientation of the target object; and
   a position and orientation measurement unit configured to measure a position and orientation of the target object by correcting the approximate value such that a shift becomes small between the geometric feature and the image feature associated by the association unit.

13. The position and orientation measurement apparatus according to claim 12,
   wherein the association unit further comprises a weight setting unit configured to set a weight to a result obtained by associating the geometric feature with the image feature,
   wherein the weight setting unit extracts an image feature in the two-dimensional image corresponding to a geometric feature extracted from the three-dimensional model based on an approximate value of a position and orientation of the target object, and sets a larger weight to the result obtained by associating the geometric feature with the image feature in a case where the extracted image feature is not within the shadow edge boundary region, than in a case where the extracted image feature is within the shadow edge boundary region, and
   wherein the position and orientation measurement unit measures a position and orientation of the target object based on the set weight and the associated result.

14. The position and orientation measurement apparatus according to claim 13, wherein the weight setting unit sets zero as a weight to a result obtained by associating the geometric feature with the image feature in a case where the extracted image feature is within the shadow edge boundary region.

15. The position and orientation measurement apparatus according to claim 12, wherein the association unit
   extracts an image feature in the two-dimensional image corresponding to a geometric feature extracted from the three-dimensional model based on an approximate value of a position and orientation of the target object,
   associates the geometric feature with the image feature in a case where the extracted image feature is not within the shadow edge boundary region, and
   does not associate the geometric feature with the image feature in a case where the extracted image feature is within the shadow edge boundary region.

16. The position and orientation measurement apparatus according to claim 12, wherein the association unit extracts an image feature corresponding to a geometric feature extracted from the three-dimensional model, from a region except the shadow edge boundary region in the two-dimensional image, based on an approximate value of a position and orientation of the target object, and associates the geometric feature with the image feature.

17. The position and orientation measurement apparatus according to claim 12, wherein the two-dimensional image is a grayscale image or a color image.

18. The position and orientation measurement apparatus according to claim 12, further comprising:

a range image obtaining unit configured to obtain a range image of the target object, wherein the specifying unit specifies the boundary region based on the range image.

19. The position and orientation measurement apparatus according to claim 18, wherein the two-dimensional image and the range image are obtained by a same imaging apparatus.

20. A position and orientation measurement method comprising:
- a two-dimensional image obtaining step of obtaining a two-dimensional image of a target object;
- a specifying step of specifying a shadow edge boundary region, the shadow edge boundary region being a boundary region between an edge portion of a shadow region where an illumination irradiated to the target object in the two-dimensional image is occluded and a non-shadow region that is not the shadow region;
- an association step of associating a geometric feature extracted from a three-dimensional model, the three-dimensional model including three-dimensional shape information of the target object and the three-dimensional model being stored in a storage unit, with an image feature on the two-dimensional image corresponding to the geometric feature, based on the shadow edge boundary region specified in the specifying step and an approximate value of a position and orientation of the target object; and
- a position and orientation measurement step of measuring a position and orientation of the target object by correcting the approximate value such that a shift becomes small between the geometric feature and the image feature associated in the association step.

21. A non-transitory computer-readable storage medium storing a computer program for causing a computer to execute the position and orientation measurement method according to claim 20.

* * * * *